US011375180B2

(12) United States Patent
El Moumni

(10) Patent No.: US 11,375,180 B2
(45) Date of Patent: Jun. 28, 2022

(54) VIDEO ENGINE FOR GENERATING AN ENHANCED IMPRESSION OF DEPTH BASED UPON TWO-DIMENSIONED VIDEO CONTENT

(71) Applicant: Yousseff El Moumni, Tollinn (EE)

(72) Inventor: Youssef El Moumni, Tallinn (EE)

(*) Notice: Subject to any disclaimer, the term of this patent is extended or adjusted under 35 U.S.C. 154(b) by 0 days.

(21) Appl. No.: 17/118,393

(22) Filed: Dec. 10, 2020

(65) Prior Publication Data

US 2021/0176454 A1 Jun. 10, 2021

Related U.S. Application Data

(60) Provisional application No. 62/946,388, filed on Dec. 10, 2019.

(51) Int. Cl.

| *H04N 13/383* | (2018.01) |
|---|---|
| *H04N 13/344* | (2018.01) |
| *H04N 5/232* | (2006.01) |
| *H04N 13/122* | (2018.01) |
| *H04N 13/349* | (2018.01) |
| *H04N 19/597* | (2014.01) |

(52) U.S. Cl.
CPC ....... *H04N 13/383* (2018.05); *H04N 5/23254* (2013.01); *H04N 13/122* (2018.05); *H04N 13/344* (2018.05); *H04N 13/349* (2018.05); *H04N 19/597* (2014.11)

(58) Field of Classification Search
CPC ............. H04N 13/383; H04N 5/23254; H04N 13/344; H04N 13/349; H04N 13/122
USPC .......................................................... 348/51
See application file for complete search history.

(56) References Cited

U.S. PATENT DOCUMENTS

| 2011/0228112 A1* | 9/2011 | Kaheel ............... H04N 1/00127 |
|---|---|---|
| | | 348/208.4 |
| 2012/0147139 A1* | 6/2012 | Li ........................ H04N 13/122 |
| | | 348/43 |
| 2013/0002814 A1* | 1/2013 | Park ..................... H04N 13/122 |
| | | 348/43 |
| 2019/0222830 A1* | 7/2019 | Edwin .................... G06F 3/0346 |
| 2020/0342652 A1* | 10/2020 | Rowell ..................... G06T 7/50 |
| 2021/0082088 A1* | 3/2021 | Kikukawa ............ H04N 13/366 |

* cited by examiner

*Primary Examiner* — Tung T Vo
(74) *Attorney, Agent, or Firm* — Williams Kastner & Gibbs PLLC; Mark Lorbiecki

(57) ABSTRACT

A method and an apparatus for generating a pair of images consisting of a dominant image to be displayed to a dominant eye and a nondominant image to be displayed to a nondominant eye causes a user to perceive a three-dimensioned image. The apparatus is configured to perform the method initiated by receiving the dominant image in a dominant image buffer. A skewing engine performs a skewing transformation; a rotating engine performs a rotating transformation; and a translating engine performs a translating and scaling transformation thereby to produce the nondominant image for storage in the nondominant image buffer.

4 Claims, 8 Drawing Sheets

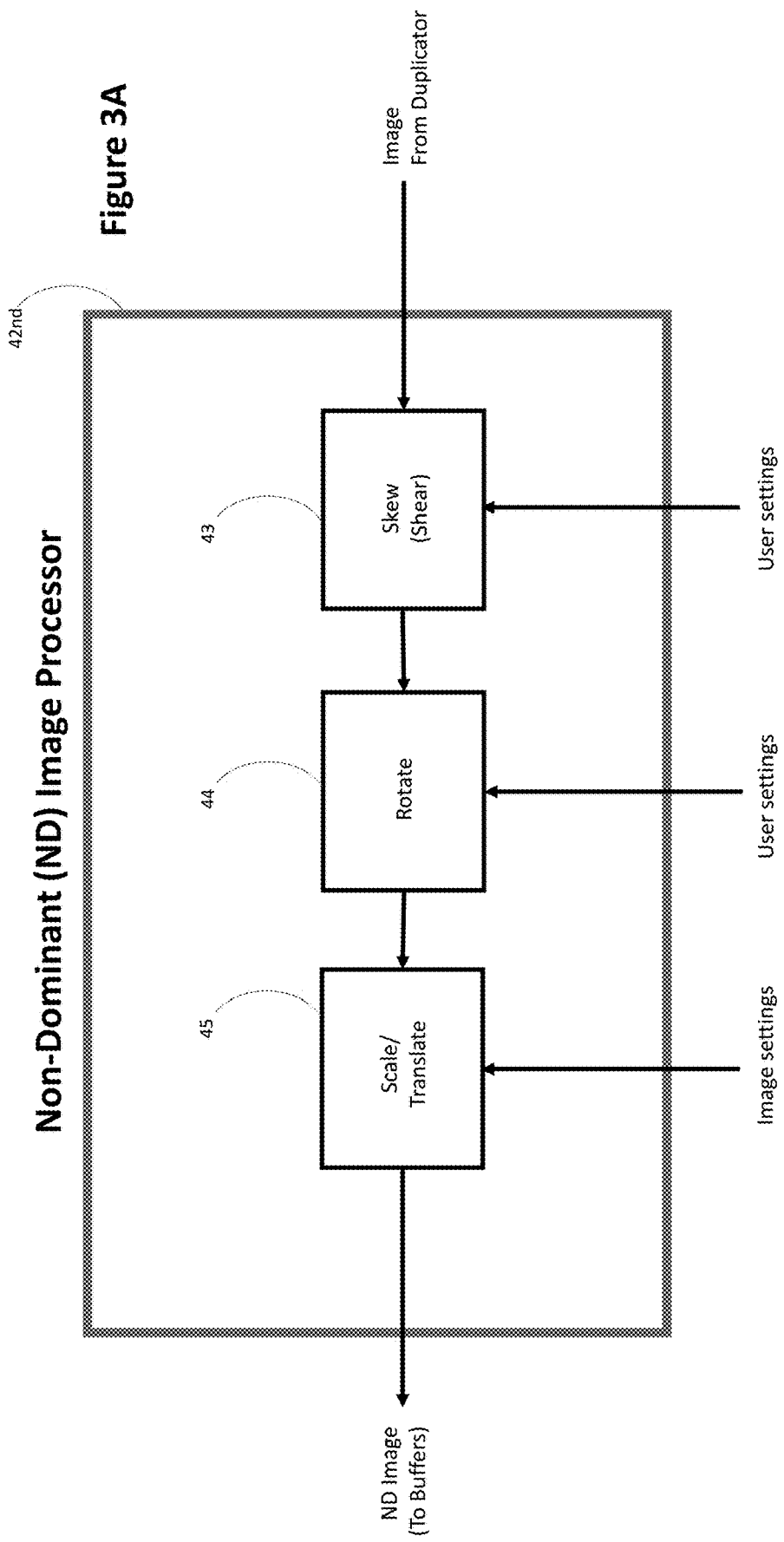

VIDEO ENGINE FOR GENERATING AN ENHANCED IMPRESSION OF DEPTH BASED UPON TWO-DIMENSIONED VIDEO CONTENT

PRIORITY CLAIM (RELATED PATENT APPLICATION)

This application claims the benefit of U.S. Provisional Patent Application No. 62/946,388, entitled "A Video Engine for Generating an Enhanced Impression of Depth Based Upon Two-Dimensioned Video Content" and filed Dec. 10, 2019, which is incorporated by reference herein in its entirety.

TECHNICAL FIELD

The present disclosure relates to a graphic engine, specifically one that generates a perception of depth from two-dimensioned content specifically a monocular stereopsis display engine.

BACKGROUND

Humans perceived their surroundings based upon two two-dimensioned images, one received at the retina in each of two eyes. To the extent that depth is perceived that perception is based upon differences in the images sensed upon each of the two retinas as well as any further clues provided in these two images such as shading found within each of the two images. The differences in these two perceived images allow depth perception simply because the process involves complex cognitive processes in a visual cortex region of the perceiver's brain.

An early system for providing depth perception known as a stereoscope presented two separate images, depicting left-eye and right-eye views of the same scene, as a single three-dimensional image. One can think of "stereopsis" as depth perception. When a visually normal human being looks at an object, each eye sees it from a slightly different angle, and sends those pictures back to the brain. The differences between the two images are integrated into a single perception and the differences between the two images are thought to be used within the viewer's visual cortex to show what is nearer, etc., creating the 3D effect. Many have sought to use this 3D effect to produce a more realistic perception of a scene depicted in some graphic medium.

One early stereoscope, created by the distinguished jurist, Oliver Wendell Holmes, which dates from the 1850s, consisted of two prismatic lenses and a wooden stand to hold the stereo card, having two views of a subject scene, the views originating from points separated by a selected distance to provide the eyes with images that might replicate what each eye might see in what might be termed "natural vision," with each eye sees the object from a slightly different angle. Since these two points of view are separated by several inches, the cerebral cortex processes the distinct images each eye perceives. Each picture is focused by a separate lens, and by showing each eye a photograph taken several inches apart from each other but aligned along a horizontal axis and focused on the same point; the perception of the pair recreates the natural effect of seeing things in three dimensions. Many conventional three-dimensioned systems produce such a pair with left and right distinct perspective images. The current solutions to generating VR are based upon either a pair captured from a real-world scene using a stereoscopic camera or, where computer-generated imagery (CGI) is employed, virtual cameras aligned in the graphics space to produce a similar captured pair.

A somewhat more modern version of the viewer is known as a View-Master®. View-Master® is the trademark name of a line of special-format stereoscopes and corresponding View-Master® "reels", which are thin cardboard disks containing seven stereoscopic 3-D pairs of small transparent color photographs on film. For those familiar with the View-Master®, the basic workings of a stereoptic viewer are known.

But this approach to inducing a sensation of three-dimensions has its shortcomings. At any great distances from the viewer, the separation between the eyes cannot yield any significant distinction between the two images projected on the respective retinas of the viewer. To adapt to achieve depth perception in more distant vistas the separation between the two-eyes or cameras, known as the convergence distance, can be adjusted by horizontally shifting each camera outward. For instance, in aerial photography, to achieve usable photographic pairs, using forest service guidelines, the exemplary separations would be:

| | |
|---|---|
| Scale | 1:20,000 |
| Effective Screen Size | 230 mm × 230 mm |
| Established flight plan Altitude: | 152 mm × 20,000 = 3,000 m |
| Spacing: | 230 mm × 20,000 × 0.3 = 1,380 m (30% sidelap) |
| Exposure interval: | 230 mm × 20,000 × 0.6 = 2,760 m (60% overlap) |

Thus, at about 10,000 feet above the hard deck, the pictures would be taken as though the eye separation would be 9,000 feet apart. Likewise, in computer graphic capture, the convergence distance is, likewise, adjusted by creating asymmetric camera frusta for the two virtual cameras to achieve the ability to perceive depth, known as "off-axis projection", which results in the same effects as 'shift-sensor' in real-world capture. Binocular stereopsis can be impractical where precise positioning of the aerial vehicle to capture the photos at relatively the same time, proves to be difficult.

There are many technical problems associated with conventional binocular stereopsis display systems and associated methods configured to create depth perception to users. Before discussing the neuropsychological or perception problems, a first issue presents itself. If a two-dimensioned image requires a great deal of processing power and transmission of data over a data bus to supply a satisfactory or desired quality of the image, the necessary doubling of the data to transmit an image pair doubles the load on the hardware. Thus, by definition, twice the effort and resources are necessary to generate a stereoptic display in accord with the Holmes viewer, i.e., generating two such images of captured or generated from slightly different viewpoints separated by a selected distance. Thus, to generate such a three-dimensioned image set in what is commonly referred to as 4k imaging, i.e., each of the two images will require high definition resolutions: 3840×2160 pixels or 4096×2160 pixels. So, to generate each of the two such images that make up a photographic pair "costs" two times as many pixels as each single image. In a meaningful video stream, each pixel of the 17,694,720 active pixels must be fed with a stream of data to tell that pixel what color to display and at what intensity it must display that color to meet that same 4k image standard. To transmit video, then, the whole of these 17,694,720 active pixels must be either sent to the video display device (all references to such a video display device shall be expressed as "headset" but shall refer to all such stereoptic devices) or generated therein to produce realistic imaging. Often a thirty Hertz frame rate is conventional. Thus, three-dimensioned imaging produced by binocular means will require data to fill half a billion data points per second. Regardless of the speed of the available hardware, the data load is considerable.

It makes simple sense that twice the data payload is necessary to be transmitted to a remotely located display to generate each of the two images necessary to give the view a perception of depth at the same resolution as a comparable two-dimensioned display. While there have been some compression protocols that lessen that overhead in situations by only changing in the images that part of the image that is changing from one temporal frame to the next, the number of pixels requiring populating is still considerable. Even when exploiting such compression, three-dimensioned imaging remains quite costly in terms of data payload. But, the costly nature of this stereoptic display is only one of its shortcomings relative to producing an experience like being within the environment the images portray.

There are further issues presented when stereoptic headsets, a wearable head mounted device such as a near-eye display. These are often termed "virtual reality" ("VR") headsets. The makers of the most popular VR headsets, the Oculus Rift™ and HTC Vive™ recommend taking "at least a 10 to 15-minute break every 30 minutes, even if you don't think you need it."

Disorientation varies very widely among VR users. Those who are prone to motion sickness or vertigo are much more likely to experience uncomfortable disorientation while in VR, but the feeling can happen to anyone that has not taken a break in a while. Games that involve flying, high-speed movement, heights and falling are known to cause extreme disorientation and should be avoided by anyone prone to this kind of reaction. Makers of VR headsets say that "you should take off the equipment immediately if you feel dizzy at all."

Most makers of VR equipment and headsets don't recommend people with epileptic conditions or special sensitivities to rapidly changing light try the experience, but these symptoms can occur even if the user has never experienced a seizure before. According to the instructional booklet that comes with the Oculus Rift:

Some people (about 1 in 4000) may have severe dizziness, seizures, eye or muscle twitching or blackouts triggered by light flashes or patterns, and this may occur while they are watching TV, playing video games or experiencing virtual reality, even if they have never had a seizure or blackout before or have no history of seizures or epilepsy.

VR is well-known to cause nausea, mostly as it is related to motion sickness and the speed of the objects moving in the game the user is playing. A few studies have looked at another condition known as "cybersickness" or "sim sickness" that is caused by being overwhelmingly immersed by a simulated reality. In the real world, all of one's senses work in synchronous analysis to take in observations from the world around the user and are typically in agreement with one another. But gaming in VR or while watching a 3D movie, the eyes and ears are taking in observations that don't agree with those perceived by other senses; this lack of agreement between senses starts to make a viewer feel sick after extended periods of time.

Understanding that two images are more costly in terms of data, the instant invention seeks to rely upon the data necessary to generate a single image. The problem is that conventional understanding of depth perception requires two distinct images and, thus, the corresponding data payload. To use only one eye to perceive depth presumes the visual cortex to be able to process a multitude of monocular cues to suggest the presence of depth, such as perspective, size, and order, as well as cues that include movement, such as motion parallax and looming.

There is thus a substantial body of literature demonstrating stereo vision in non-primate and non-mammalian systems. Stereopsis has evolved independently at least four times: in mammals, birds, amphibians and insects. Stereopsis cannot have been inherited from the common ancestor of these taxa, because binocular vision evolved independently in mammals, birds and amphibians, and eyes themselves evolved independently in insects. Stereo vision must have evolved because of the selective advantages it confers in particular ecologies. Most obviously, stereopsis could enable an organism to judge the distance to objects in its environment. In primates, for example, a suggested adaptive value that might have led to the evolution of stereo vision is that it enables prehension, the ability to judge distances and grasp objects, e.g. when moving between branches. More generally, distance measurement or 'range finding' is important in several other contexts, including navigation, prey capture and predator avoidance.

As discussed above, the stereoscopic effect falls off rapidly with distance. As reported by one ophthalmologist, 'Stereoscopic vision is of little value except in a few occupations,' with the primary advantage of having two eyes being reported as having 'a spare one,' in case of visual impairment. However, the complex two-eyed visual system is designed not simply for redundancy, but primarily to allow both eyes to work together to extract information from the environment. Approximately 60 percent of the human visual field overlaps, where greater peripheral vision is sacrificed in favor of information provided by binocular disparity, but this results in benefits to functional ability.

In the mid-18th century, there was invented a "zograscope," an optical device for magnifying flat pictures that also has the property of enhancing the sense of the depth and comprises a large magnifying lens through which the picture is viewed. There is only a single image to view through the zograscope so there is no stereoptic effect. Rather, the zograscope works by minimizing other depth cues that specify the flatness and pictorial nature of the picture. The image is magnified, perhaps giving it a visual angle similar to the real scene the picture is depicting. The edges of the picture are blocked by the frame of the lens. The light coming from the lens to the eye is collimated, preventing accommodation. Because each eye views the single image from a different position, the surface of the picture could have binocular disparity from different magnification for the two eyes or from differences in the rotation of the images received by the eyes, so-called cyclodisparity. Such disparities create an overall slant of the picture surface around the vertical meridian or horizontal meridian respectively. As well, colored parts of the image will be refracted differently for each eye, creating a version of chromostereopsis. Even if the binocular disparity were incorrect for the surface of the image or any colored parts of it, the stereoscopic information tends to integrate with the other depth information in the image.

The user of the zograscope views a picture through a large lens of positive power. The picture is placed at the focal plane of the lens. The user looks through the lens with both eyes. The picture is scrutinized via eye movements. Eye movements are necessary because the field of view is quite large, about 30°-40°. Because the picture is at the focal plane, the observer neither must adjust vergence nor accommodation, as the fixation point is changed. The two eyes receive nearly identical images which removes effectively the physiological cues, e.g., binocular disparity, vergence, monocular movement parallax, head movement parallax, accommodation, and blur, which might reveal that the picture is actually a flat surface covered with pigments in a particular simultaneous arrangement. As a result, pictorial space develops in "monocular stereopsis," which results in a vivid impression of markedly increased "plasticity" as compared with viewing the picture binocularly without the instrument. The fact of perceived three-dimensioned, even with identical images being fed to each of the two eyes, suggests that monocular or one-eyed stereopsis is possible, i.e., perceiving three-dimensional relations with a single eye.

Monocular stereopsis is due to so-called "pictorial cues." The effect is somewhat similar to viewing a large painting from a distance with one eye closed, a case familiar from the literature on the visual arts. In the 20th century, Moritz von Rohr, an optics engineer working at the Zeiss optical factory, developed "synopters" that essentially achieved the same effect, although with (much) better optical quality.

The perceived spatial structure of pictorial space is due to the user's interpretation of the remaining pictorial cues. As a consequence, many (or perhaps most) observers are aware of a heightened "plasticity" of the pictorial content for zograscopic as compared with natural viewing. If there is any effect it has to be due to the removal of all but purely pictorial cues. Writing in 1941, Harold Schlosberg remarks:

> In the period around 1910, when interest in stereoscopy was high, it was widely known that the "plastic" effect could be obtained almost as well by viewing a single picture through a lens as by the use of disparate pictures in the binocular stereoscope. The phenomenon has been largely forgotten during the last two decades and does not seem to be mentioned in any of the standard introductory texts of psychology . . . . A surprisingly large proportion of psychologists are unaware of the phenomenon, and somewhat at a loss for an explanation . . . the plastic depth that can be obtained monocularly is very striking and must be seen to be appreciated . . . . To summarize: the phenomenon of monocular plastic depth is due to the release of certain monocular factors from overpowering cues, largely binocular, that show the picture to be flat. (Schlosberg, 1941)

The zograscope was intended to view single static pictures (thus not stereographic pairs) with no provision for movement within the viewed image. The zograscope makes no sense in the context of conventional stereoptic viewing. There is only one image and one lens. In fact, the lens works to blur some of the field of view for each eye. The zograscope and the sense of heightened depth perception makes even less sense when one considers minor head movements (translations and rotations), as are certain to occur in actual use. Longitudinal translations change the eye relief, and thus the lateral locations of the entrance beams in the case of off-axis fixations. Lateral translations affect the locations of the entrance beams even for straight ahead fixations. Thus, the effect of perceived depth the zograscope provides is a remarkably complicated. In practice, head attitude and location, as well as fixation directions (including vergence and cyclovergence movements), and states of accommodation are unknown. The appreciation of the plasticity resulting from monocular stereopsis has largely disappeared from the literature in the standard contemporary textbooks. In fact "stereopsis" is nowadays commonly defined as exclusively as "binocular stereopsis," and even the term "monocular stereopsis" is taken to be self-contradictory.

The principle of the zograscope appears simple enough, although the explanations offered in various places are frequently nonsensical. The observer views a picture through a large lens of positive power. The picture is placed at the focal plane of the lens. The observer looks through the lens with both eyes. The picture is scrutinized via eye movements. Eye movements are necessary because the field of view is quite large, about 30°-40°. But, the zograscope presents this question because the flat viewed two-dimensioned image is placed at the focal plane. Because the image is in focus, the observer is not tasked with either vergence nor accommodation, as the fixation point is changed. The two eyes receive nearly identical images. The zograscope effectively removes the physiological cues that provide a perception of depth, e.g., binocular disparity, vergence, monocular movement parallax, head movement parallax, accommodation, and blur. One would assume that viewing a flat image through a zograscope would reveal that the picture is actually a flat surface covered with pigments in a particular simultaneous arrangement. As a result, zograscope presents an enigma in developing "monocular stereopsis," which, in spite of a flat source image results in a vivid impression of markedly increased "plasticity" as compared with viewing the picture binocularly without the instrument.

It is this enigma that presents a basis for the instant invention. When a picture is viewed without the zograscope, i.e. normally with both eyes, the picture's surface is visible because of cues such as binocular disparity and the visible frame of the picture. A viewer can perceive distance cues in a picture such as binocular convergence, vertical disparity, and the accommodative state of the lens specify the distance of this visible picture surface rather than the pictorial contents but no three-dimensioned perception results. When the zograscope is interposed, there are no known optical cues that specify the distance of pictorial objects from the observer. Some researchers have noted that depth-of-focus blur may be perceived yielding a distance cue in pictures that triggers an enhanced perception of depth. It may be that familiar size of objects allows the viewer to cognitively infer distances in pictures or may serve to bias distance judgments in the presence of other distance cues. These inferences may produce a sensation of monocular stereopsis.

Another design presents an enhanced perception of depth without distinct images to make up an image pair is known as the Doppelverant. The Doppelverant is essentially a high-quality stereoscope and is used with two copies of a single image rather than to rely upon a stereo pair. The plasticity achieved by the Doppelverant was frequently rated better than what could be achieved via the usual disparate images. The disparate images suffer from a marked "coulisses effect," that is, they tend to yield a depth stack of flattish, silhouette forms, instead of neatly rounded, volumetric pictorial shapes. In contradistinction, the Doppelverant yields pleasantly articulated ("plastic") pictorial reliefs.

As stated, the the zograscope presents two different images to respective eyes, images that are not identical though they result from viewing a single image. A single lens of that aperture (ca. 1:3 to 1:4) is certain to have a large degree of spherical deviation on axis, and huge amounts of astigmatic and comatic aberrations at 20° off axis. Moreover, the Petzval field curvature has to be appreciable to trigger the enhanced depth perception. In addition to these aberrations, there will additionally be a huge chromatic aberration for the typical glass profiles (standard crown) used for the lens. Moreover, the optics of the zograscope should take the eye optics into account, including the motility of the eyes. Observers typically make minor corrective eye movements and (depending upon age) accommodation changes, small enough not to count as physiological cues, but enough to cancel various imperfections of the optical system. The blur regions for the left and right eyes are different and may be astigmatic "lines" of rather different length that meet at an angle. Two distinct images result from a single source picture.

Because of the horizontal separation of the eyes, the zograscope is not rotationally symmetric about the axis. There is a minor magnification difference of 3.25% between the vertical and horizontal directions. All aberrations depend not only on the distance from the axis but also on the azimuthal location (angle with the horizontal). The numbers given above are all worst case. Longitudinal translations change the eye relief, and thus the lateral locations of the entrance beams in the case of off-axis fixations. Lateral translations affect the locations of the entrance beams even for straight ahead fixations. Thus, the zograscope is a remarkably complicated, dynamic optical system. In practice, head attitude and location, as well as fixation directions (including vergence and cyclovergence movements), and states of accommodation are unknown. Pupil sizes will probably vary too, affecting the depth of field. The characterizations discussed above allow a reasonable insight into the performance of the system but are in no way exhaustive.

Roughly speaking, the zograscope works because it removes (at least to a large extent) the physiological cues that reveal pictures as being planar surfaces covered with pigments in some simultaneous configuration. The effect is like that of closing an eye when looking at a painting, a technique that has served painters for centuries, and is still in widespread use. The zograscope is more convenient, in that it allows the conventional use of both eyes. Literature on "monocular stereopsis" is generally in accordance with these findings. The existence of the zograscope suggests that there might be alternate means of generation a perception of three dimensions while relying upon a single image.

There exists a need for a means of producing a sensation of depth while only relying upon on single two-dimensional image, thereby reducing by half the amount of data necessary for a user's enhanced perception of depth. It is also posited that because the neuropsychological task in generating this perception of depth, it might be far more, rather than less, comfortable to the user as one would expect that if the brain generates an image that can be perceived as having depth, it would do so in a manner least disruptive to the brain's sense of equilibrium and expectations relative to movement.

SUMMARY

A method and an apparatus for generating a pair of images consisting of a dominant image to be displayed to a dominant eye, and a nondominant image to be displayed to a nondominant eye, causes a user to perceive a three-dimensioned image. The apparatus is configured to perform the method, initiated by receiving the dominant image in a dominant image buffer. A skewing engine performs a skewing transformation; a rotating engine performs a rotating transformation; and a translating engine performs a translating and scaling transformation thereby to produce the nondominant image for storage in the nondominant image buffer. The present disclosure seeks to provide an improved image delivery system. For example, an image display system, that creates a perception of depth in a presented view to a user, wherein the improved image delivery system employs monocular stereopsis in contradistinction to known 3D image delivery system that employ binocular stereopsis based on employing two mutually-different perspective images of a given scene. The present disclosure also seeks to provide an improved method for creating a perception of depth in a presented view by employing monocular stereopsis.

The present invention also seeks to provide a solution to the existing technical problem of high complexity and poor system performance, such as low-quality output graphics, high computational processing power requirement and high costs involved in creating depth. An aim of the present disclosure is to provide a solution that overcomes at least partially the technical problems encountered in prior art that employs binocular stereopsis, and provides a simplified image delivery system and method that provides a high quality visual output with significantly reduced computational processing power requirement as compared to existing solutions for generating depth.

As stated, one objective of this image system it generates from a single image a transform, thereof to provide two images to a given user that when viewed such that each eye is provided with one of the two images, the result is that the user perceives depth in a manner distinct from viewing the original single image. In operation, the system does:
  receive a two-dimensioned source image that is captured from a single viewpoint, i.e. there is no special encoding, it exists as a conventional "flat" image;
  generate a secondary image from the source image by processing data in the firms image in accord a specific morphism, thus, to generate the secondary image; and
  provide a composite view that user perceives when viewing the source image with a dominant eye and the generated image with a non-dominant eye resulting in a user perception of depth within the composite view.

The imaging system employs at least one data processor that, when in operation, that processor processes data the source image provides, thus to generate the secondary image and in a preferred embodiment, to display the images on an optical instrument comprising conventional optical components, the optical components including those selected from a group including prisms, mirrors, zone plates, lenses, or comprising a combination thereof.

While the delivery of images to the user will, in the presently preferred embodiment, be based upon a single frame at an instance, which will be termed herein as the "dominant image". A nondominant image is derived from the dominant image. The key task of the inventive engine is to compose two images that will together allow the user an enhanced sensation of depth while experiencing two-dimensioned imagery; the dominant and nondominant images together are an image pair.

While a headset may be used as a display, any reference thereto also applies to any known form of the binocular stereopsis. Thus, where this application refers to a headset, the reference to the headset also any virtual retinal display ("VRD"), also known as a retinal scan display ("RSD") or retinal projector ("RP"), as well as any shutter system which works by presenting the image intended for the left eye while blocking the right eye's view, while presenting the right-eye image while blocking the left eye. The perception of motion is by presenting a series of these pairs just as a conventional movie presents single images in a series. Motion is suggested by the presentation of this series so rapidly that the interruptions that the transitions from image to following image. That the images are presented as pairs rather than single frames does not interfere with the perceived fusion of the two images into a single 3D image.

Thus, a VR headset, as expressed herein will refer to any system to present stereoscopic picture pairs to a viewer. In this document, "VR headset" will also refer to such systems where two images are projected to be superimposed onto the same screen and wherein the viewer views the screen through spectacles having two distinct polarizing filters, one for each eye. "VR headset" will also include, for example, any similar system exploiting specific wavelengths of red, green, and blue for the right eye, and different wavelengths of red, green, and blue for the left eye especially the anaglyph 3D. Anaglyph 3D is the name given to the stereoscopic 3D effect achieved by means of encoding each eye's image using filters of different (usually chromatically opposite) colors, typically red and cyan; and the ChromaDepth procedure of American Paper Optics. The ChromaDepth system is based on the fact that with a prism, colors are separated by varying degrees—the ChromaDepth eyeglasses contain special view foils, which comprise microscopically small prisms. Each of these methods of delivering the stereoptic sensation will perform equally well to deliver images by the instant graphics engine. Thus, in no instance will the reference to a headset be interpreted to exclude these other delivery mechanisms and any claim to novelty will be based largely but not exclusively on the generation of the second or nondominant image from a first two-dimensioned image or dominant image.

In preferred embodiments, the headset or head-mounted display ("HMD") generates composite content at a level of resolution readily perceived by a retina of a typical human eye. In a preferred embodiment, an inset portion of the image is delivered at a resolution corresponding to that of a fovea region of the human eye. The remaining portion or area perceived outside of the fovea region is selected and blended such that its resolution smoothly varies between the resolution of the inset portion and a selected resolution of the background region. A controller samples a provided two-dimensional image (static or dynamic content) and a processor performs a transform allowing it to generate a second image for projected for display in the nondominant eye as the original image is simultaneously projected for display in the dominant eye.

The morphism discussed above is the combination of several affine image transforms. In generating the second image (consistently used here, the term second image will refer to the transformed image projected for the nondominant eye whereas first image will refer to that untransformed image projected for the dominant eye) will include, in various degrees an image skew, an image translation, and an image rotation. While assuredly, the invention performs well within such a construct, the Inventor is aware that this same experience of depth in viewing exploiting other and distinct degrees of image skew, translation, and rotation than strict adherence to the pin cushion distortion paradigm. The Inventor notes that because the instant image generation engine exploits the neuropsychological abilities of the user's own brain to compose the first and second images into a unified whole of the perception of the image, human comfort will allow a fine tuning of the experience to the user's best advantage. Thus, the presently preferred embodiment of the invention encompasses an ability to modify exact quantities of image skew, translation, and rotation such that the user might adjust specific degrees each of these modifications for comfort and efficacy.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIG. 3A depicts a further detail of the nondominant image processor as is portrayed in FIG. 2;

DETAILED DESCRIPTION OF A PRESENTLY PREFERRED EMBODIMENT

Figure 1:
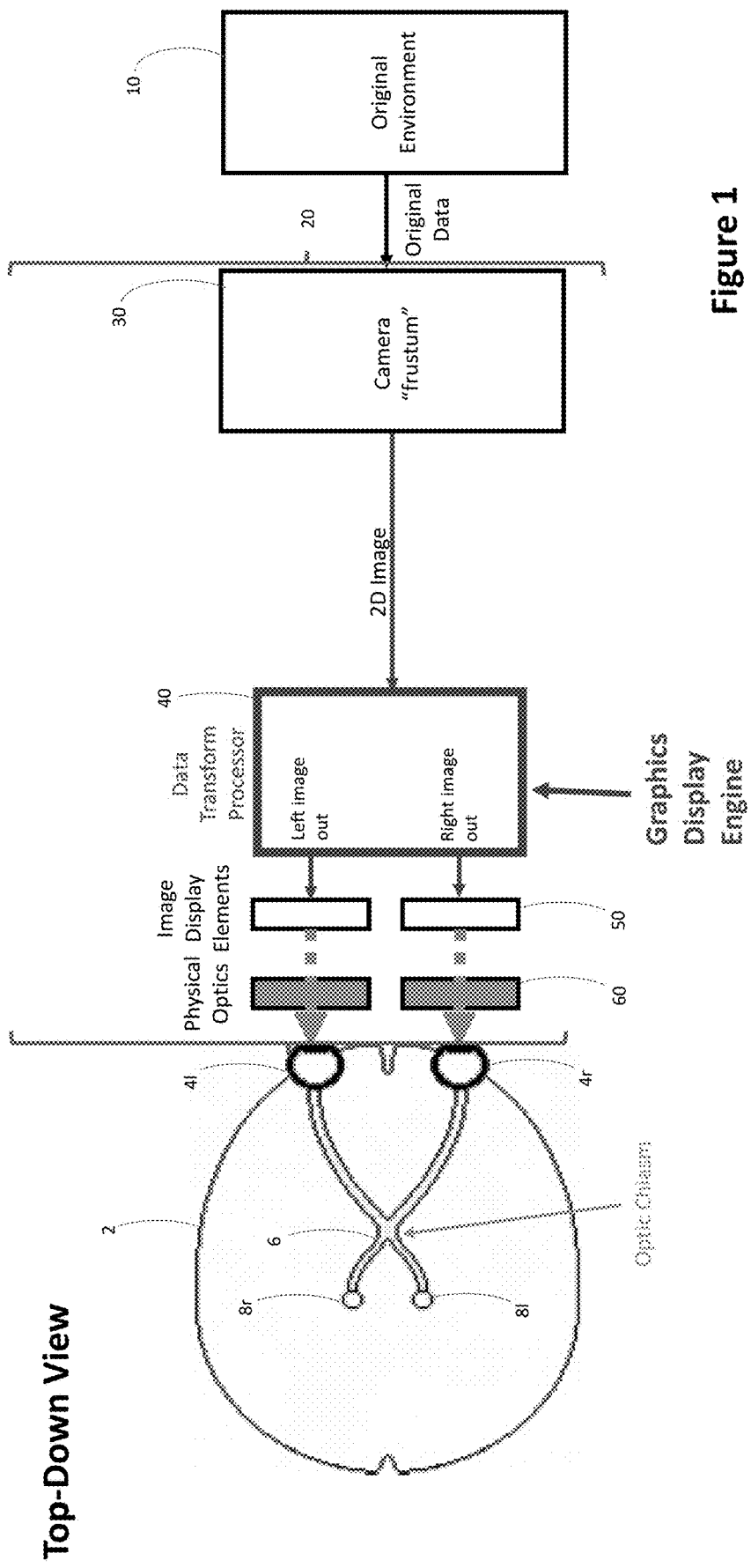
FIG. 1 depicts a block diagram of an inventive headset, by way of non-limiting example to make up an augmented reality display system for enhancing perception while employing monocular stereopsis in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible. To aid in the understanding of the invention, the Inventor will use several definitions in order to effectively compare and contrast conventional means of what might be described as a three-dimensioned viewing experience (herein "3D") in contrast to this enhanced viewing of a two-dimensioned image:

"Binocular stereopsis" relates to providing a 3D viewing experience to a given user by displaying left- and right-images to left- and right-eyes of the given user, respectively, wherein the left- and right-images are captured at mutually different perspectives relative to a given scene. "Binocular stereopsis" does not need to take into consideration which of the given user's eyes is a dominant eye, and which is a non-dominant eye. Binocular stereopsis is the conventional means of generating a 3D viewing experience and allows the eyes and brain to place elements in an image by a form of triangulation, the distance between the eyes being the base of the triangle that enables this form of depth perception.

"Monocular stereopsis" will refer to elements in perception that allow the instant invention to providing an enhanced experience of depth when a given user is provided a 2D source first image to a dominant eye of the given user, and, in the instant case, applying a morphosis to the 2D source image to generate a second image, and presenting the second image to a non-dominant eye of the given user. It is the Inventor's assertion that a visual cortex of a brain of the given user employs the source image to appreciate subject matter of the 2D source image, and employs the secondary image to enhance a quality that has been identified as placisity and, thereby, to cue user-learned experiences of depth and, further thereby, to interpret the source image in a manner to provide an enhanced appreciation of depth in the viewing experience.

"Augmented Reality" ("AR") relates to an enhanced version of reality created using any imaging technology to overlay onto an image of the user's surroundings selected digital information. Thus, by way of non-limiting example, a cartoon character can be projected onto an image of the user's environment as perceived by an image capture means (such as a smartphone camera). Such an augmented reality capability has been used to enable such games as the Nintendo Pokemon Go® game of 2017.

"Virtual Reality" ("VR") relates to the use of computer technology to create a simulated environment, wherein the VR can employ either of a 2D image or a 3D image arrangement. Typically, headsets are employed having accelerometers to sense movement such that the image the user views is a function of a rotation of a given user's head when using the headsets. This gives the users the "look right"; "look left"; "look up"; and "look down" capability.

"Monocular" is defined as a use of a single eye of a given user or use of a single view.

"Binocular" refers to use of both eyes of a given user, where the image perceived in each eye is from a distinct point of view to lend depth perception based upon triangulation; this is conventionally employed in contemporary virtual reality headsets.

"Binocular rivalry" vs "binocular fusion" is defined such that binocular rivalry is a phenomenon of visual perception in which perception in a given user alternates between different images presented to each eye of the given user; such rivalry potentially causes nausea and fatigue and is encountered in conventional virtual reality headsets relying upon triangulation to enhance depth perception; "fusion" is defined where images received in both eyes of a given user merge successfully and are perceived in a visual cortex of the given user as a 3D view.

"Coherence" is defined as a situation when parts of something fit together in a natural or reasonable way; for example, when creating a 3D viewing experience, images presented to eyes of a given user and interpreted by a visual cortex of the user's brain to form a natural and stable manner.

"Stereopsis" is defined as being a perception of depth using both eyes of a given user. Overlapping of vision occurs due to the position of eyes on a head of the given user, wherein eyes are located on the front of the head. This overlap allows each eye to view objects with a slightly different viewpoint. As a result of this overlap of vision, binocular vision provides a perception of depth. "Stereopsis" (from "stereo-" meaning "solid" or "three-dimensional", and "opsis" meaning "appearance" or "sight") is the impression of depth that is perceived when a scene is viewed with both eyes by the given user with normal binocular vision. Binocular viewing of a scene creates two slightly different images of the scene in the two eyes due to the eyes' different positions on the head. These differences, referred to as binocular disparity, provide information that the given user's brain can use to calculate depth in the visual scene, providing a major means of depth perception.

"Plasticity" is defined as a perception that occurs in a human visual cortex, in combination with a corresponding human cortex, namely provide a perception of volumetric appearance.

FIG. 1 shows the instant invention in use for the purpose of perceiving augmented reality. While all the hardware in FIG. 1 together will make up a head set 20 for perceiving the user environment 10. The user 2, perceives the generated image in a right eye 4r and a left eye 4l. These images come together in the Optic Chiasm where neurons group together to prioritize cues from the retinal images in the dominant and non-dominant eyes 4r and 4l depending upon the user 2. After processing at the Optic Chiasm, stimuli are generated in the brain (interestingly enough, the optic cortices cross such that while both hemispheres of the brain contain a visual cortex; the visual cortex 8r in the left hemisphere receives signals from the right visual field, and the visual cortex 8l in the right hemisphere receives signals from the left visual field. Between the user 2 and the environment 10, a camera defines a part of a cone, a "frustum," within the volume of which, images are captured. The term "frustum" or "view frustum" in any context that relates to computer graphics is the region of space in the modeled world that may appear on the screen; it is the field of view of the notional or actual camera 30. In the case of augmented reality, the frustum is only relevant as a field into which to place additional imagery and then to calculate the images necessary to generate the sensation of depth.

As the camera captures a two-dimensioned image, it transfers the data to an inventive graphics display engine 40. Within the engine 40, a second image is generated from the first. The details of the transform are set out below in reference to FIG. 2.

The human visual system couples both of accommodation and convergence. One aspect of this coupling is convergence accommodation: as the eyes converge, they accommodate as if to focus objects nearer and nearer. Studies of this phenomenon show that convergence alone, in the absence of blur, can drive accommodation. The converse aspect of this coupling is accommodative convergence: when one eye accommodates to a target, the visual axes converge to fixate that target. Studies of this phenomenon reveal that a subject, when accommodating to a monocularly presented near target, will exhibit convergence (as well as accommodation in the other eye) even though the monocular presentation eliminates the need for convergence. In short, convergence in the absence of disparity can drive accommodation, and accommodation in the absence of disparity can drive convergence and also accommodation of the other eye. For this reason, the multi-element optics can assist in accommodation of both eyes but allowing the eyes 4l, 4r, to focus in the far field where they can do so with a minimum of effort, in contrast to near-field focusing.

A third aspect of this coupling is variability: the control parameters vary with the optical stimulus. The is no doubt that the existence of adaptive elements that regulate the bias in the convergence or accommodation systems can be used to optimally focus at a relaxing focal length. For that reason, two display elements 50 are each to present images to respective eyes and thereby to allow the eyes to focus as though on a distant target with the assistance of actual lenses which are here grouped as physical optics 60. Four implemented visual behaviors exist that have biological analogues:

The aperture adjustment behavior is analogous to pupil constriction;

The focus-fixate behavior is analogous to accommodative convergence;

The stereo-focus behavior is analogous to convergence accommodation, where disparity estimation serves as virtual convergence; and The focus-predict-focus behavior is analogous to accommodative convergence, where disparity prediction acts as virtual convergence.

The science of optical lenses is well-known and, thus, selections of lenses can be made to produce more sequential coupling between convergence and accommodation than the approach taken by nature for the human visual system. Each of the two display elements 50 and the correlative lenses as physical optics 60 are chosen as to optimize accommodating to a monocularly presented near target, will exhibit convergence (as well as accommodation in the other eye) even though the monocular presentation eliminates the need for convergence. In short, lenses are selected to assure convergence in the absence of disparity which, in turn, can drive accommodation, and accommodation in the absence of disparity can drive convergence and, also, accommodation of the other eye. Apart from the workings of the graphics display engine 40, many of the issues relative to configuration are well-known in conventional headset configuration.

Figure 2:
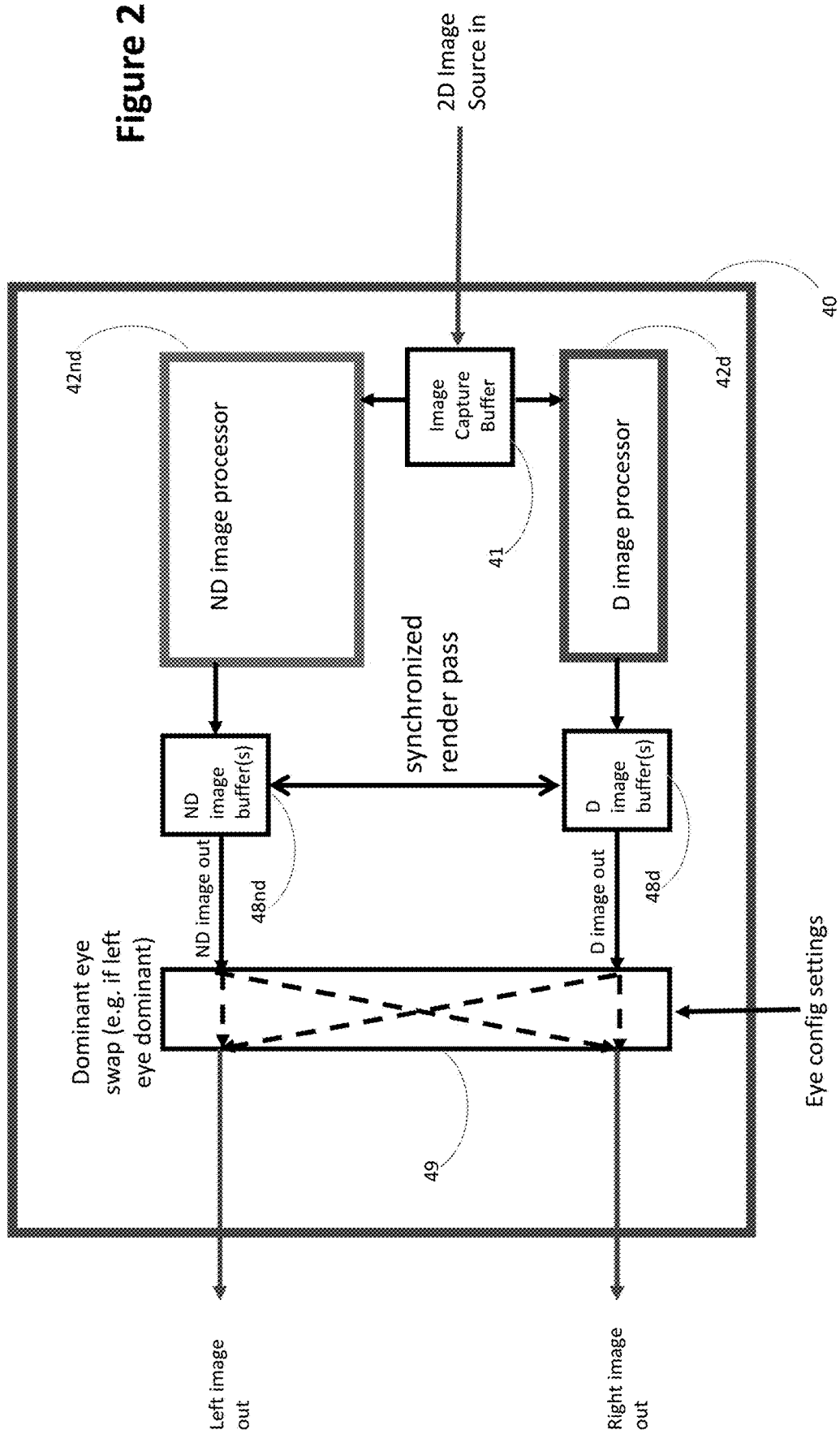
FIG. 2 depicts a detail of an inventive graphics display engine.

Moving then to FIG. 2, the actions of the inventive graphics display engine 40 of are exhibited. As understood from FIG. 1, the camera 30 feeds the graphics display engine 40 a two-dimensioned image. In the inventive graphic display engine 40, the first image is, in fact, a live-action movie of the user environment 10 taken at the camera 30 and fed with as little latency as possible to an image capture buffer as camera frustrum 30. There, at the camera frustrum 30, each frame is fed to an image processor 42*d*.

The image processor 42*d*, also known as an image processing engine, image processing unit (IPU), or image signal processor (ISP), is a type of media processor or specialized digital signal processor (DSP) used for image processing, in digital cameras or other devices. Image processors often employ parallel computing even with SIMD or MIMD technologies to increase speed and efficiency. The digital image processing engine can perform a range of tasks. To increase the system integration on embedded devices, often it is a system on a chip with multi-core processor architecture.

For example, one such optional but useful feature is noise reduction. Noise is always present in digital images during image acquisition, coding, transmission, and processing steps. The feature, when used, will reduce noise without losing image features (edges, corners, and other sharp structures). In this exemplary embodiment, the image processor 42*d* controls the High ISO Speed Noise Reduction feature. It instantly separates noise and image information from vast quantities of image data and reduces the noise digitally, ensuring that even images shot at high ISO speeds are pristine with minimal digital noise. The noise reduction is accomplished using conventional image processing methods and by its operation assures that a base image for producing the three-dimensioned perception is optimally presented to the image processor 42*d*.

Another feature of the image processor is used to control the autofocus (AF) functionality. Advancements to Dual Pixel CMOS AF are particularly enabling. One exemplary embodiment exploits a feature much like that found using a Dual Pixel CMOS AF® sensor such as that used by Canon.

To optimize autofocusing, each pixel on the image sensor is comprises two independent photodiodes. The information captured by each photodiode is used to perform phase difference detection and that phase difference drives an iterative process to rapidly acquire focus. When the phase difference is minimized in a selected region of the image, for example, on a face of a subject of the intended image, focus is accomplished in that region. Thus, image capture can occur with minimal or no human assistance.

This rapid automated image capture enables augmented reality by providing a dominant image with optimal presentation of the greatest possible volume of image information to the image processor 42*d*. In use, the dominant image processor 42*d* processes all this information rapidly, instantly evaluating the subject's brightness and color and may, as well, be used in detecting faces. The dominant image processor 42*d* in the presently preferred embodiment transmits this information to the lens and adjusts the focusing lenses to establish focus on the subject. The image processor 42*d*, in this same embodiment, considers not merely two-dimensional information on the subject, but also depth information between the subject and the background.

In preferred embodiments of the invention, an optional image stabilization (IS) system further that works to assist in image collection for an optimal augmented reality experience. IS relies on the principles of, for example, lens-shift image stabilization such as that used in Canon® compact cameras. In such a system, vibration from camera shake is detected by the same gyro sensors which are built into the headset to shift the field of view due to significant head movement and this information is evaluated by the dominant image processor 42*d* which then drives the IS unit to shift the field of view to counteract these sensed shaking movements. As a result of each of these optional features of the dominant image processor 42*d*, including in some embodiments, subject recognition and tracking is faster, makes image production completer and more accurate than might be possible without its aid. It is the purpose of the dominant image processor 42*d* to produce the best possible image in two dimensions. Once the optimum image is captured and processed, the dominant image processor 42*d* passes its best efforts to the non-dominant image processor 42*d*.

The most important aspect of the function of the dominant image processor 42*d* is to preserve the nonstereoptic clues as to depth, to wit: image blurring due to motion within a field of view, colors present in the field of view, the relative brightness of features within the field of view, such depth-based blurring occurring within the field of view, perspective present within the field of view, shadows present within the field of view, atmospheric haze present within the field of view, positions and angles angle of visible features within the field of view, and occlusion of features present in the field of view. The inventive nondominant image processor 42*nd* relies upon the presence of these nonstereoptic clues. For that reason, the dominant image processor 42*d* assures in at least one embodiment is configured to preserve these cues of depth within the two-dimensional dominant image. Characteristically, while the dominant image processor 42*d* does not generate the effect of enhanced depth perception, it certainly performs conventional tasks to provide the non-dominant image processor 42*nd* sufficient information to inventively produce the second image or nondominant image. The dominant image processor 42*d* may require circuitry having a whole order in magnitude in complexity over that necessary to modify the pristine image the dominant image processor 42*d* yields to produce the second or nondominant image. It is the nondominant image, however, which, when viewed by the nondominant eye with the dominant image being viewed by the dominant eye that gives the user 2 the enhanced sensation of depth. Thus, it is the nondominant image processor 42nd that enables the three-dimensioned effect.

The nondominant image processor 42nd performs a morphism on the image the dominant image processor 42d yields to produce that second image. The nondominant image processor 42nd performs, in selected degrees, each of skewing the dominant image, translating the resulting image, and rotating the then resulting image. The nondominant image processor 42nd is even relieved of the duty to produce an accurate representation of the real world as the pristine image from the dominant image processor 42d provides the optic chiasm 6 with enough cues that it will correct the images fed to the respective optical cortices 8r, 8l. For that reason, the effect can be achieved with relatively unsophisticated hardware, the nondominant image processor 42nd when compared to optional embodiments of the dominant image processor 42d.

While more will be explained below in reference to FIG. 3A the nondominant image processor 42nd performs the described transformation of the first or dominant image to yield the second or nondominant image. In the presently preferred embodiment, the second or nondominant image is simply an altered version of the first image itself; generating a second or nondominant image requires only modest computing resources as discussed above (the task of performing the described transform, when compared to those actions of the dominant image processor 42d is not taxing; it is "computationally light"). Such a fact is hugely liberating in design, for example, should a pristine image be fed as a computer generated graphic to a headset, obviating the need for a dominant image processor 42d, a modest non-dominant image processor 42nd, such as a processor of a smart phone, would be sufficient to perform the transform of the first image without introducing significant latency into the system. Thus, the resulting headset can be little more than a housing with lenses for physical optics 60 and eye cups, making the headset both light and natural in feel, further by exploiting the smartphone's own display to provide the image display elements 50.

Naturally, to generate a sensation of three dimensioned space, the above-described dominant and nondominant images must be simultaneously presented to the respective eyes (dominant and nondominant). Synchronization of presentation of each of the first or dominant image from the dominant image processor 42d with presentation of the second or nondominant image the nondominant image processor 42nd yields assures the user's perception of a coherence and three-dimensioned image. To that end, paired image buffers, one for each of the dominant image buffer 48d and the nondominant image buffer 48nd are used to park the first image just long enough to allow the second image to catch up with it to present these in strict synchronicity at the eyes, 4r and 4l. In such a manner, any latency in the production of the nondominant image is corrected by timing in the dominant image buffer 48d.

Throughout, the terms dominant and nondominant have been used to describe the eyes, 4r and 4l of the user 2 as though the right eye, 4r is the dominant eye; there is no such requirement and in one embodiment, the control includes a switch to reverse the assignment of dominant eye to the left eye 4l. Ocular dominance, sometimes called eye preference or eyedness, is the tendency to prefer visual input from one eye to the other. It is somewhat analogous to the laterality of right- or left-handedness; however, the side of the dominant eye and the dominant hand do not always match. This is because both hemispheres control both eyes, but each one takes charge of a different half of the field of vision, and therefore a different half of both retinas.

There is thus no direct analogy between "handedness" and "eyedness" as lateral phenomena. But in a preferred embodiment of the invention includes means to determine the dominant eye and to present the first or dominant image to the dominant eye and this is found to be necessary to produce the optimum effect relative depth perception by a user 2. A feed routing switch 49 directs the first image to the dominant eye and the second image to the nondominant eye. In a preferred embodiment, the feed routing switch 49 can be used to perform a dominant eye test. To perform the test, an image is sent to each of the two display elements 50 and the physical optics 60 in what is known as a sighting test to determine the dominant eye. The test is of the "sighting" type, so named because it involves aligning a visual target with a makeshift sighting device (mimicking the "sight" on the barrel of a rifle).

In an alternate embodiment, the user 2 may manually enter the identity of the dominant eye. In either regard, the feed routing switch 49 has the purpose of feeding the first or dominant image to the dominant eye and the second or nondominant image to the nondominant eye. It is important to note that these optional features as discussed above are not necessary for creating the second of the two images that make up an inventive pair. The consideration of these optional features is presented to express the use of these discussed optimizing features to capture and to enhance the dominant image to provide a best image for operation of the inventive features to produce the non-dominant image.

Moving to the nondominant image processor 42nd, FIG. 3A depicts the mechanism by which the second or nondominant image is generated within the nondominant image processor 42nd. The nondominant image processor 42nd "tricks" the user 2 into an enhanced perception of depth. The perception of depth is not a true binocular three-dimensioned or 3D effect, but a monocular stereopsis. The device which produces an enhanced depth perception does so by inducing the user to generate that depth perception based upon visual cues perceived in the dominant image.

Conventionally, in binocular stereopsis, the user 2 perceives depth in the distinct details in two images, together termed a "stereoscopic image" captured from two horizontally aligned but distinct viewpoints within the user's environment 10; such an approach is often colloquially referred to as being "binocular vision." A visual cortex part of the brain is located near a rear portion of the brain, and there arises a spatial mapping of retinal optical sensing cells (photoreceptor cells) to corresponding parts of the visual cortex. The visual cortex itself is a multi-layer configuration of analog variable-state machines that are adaptable to undergo learning and evolved by nature to provide visual correlation in a massively temporally parallel manner. Thus, it will be appreciated that the human brain provides a 3D depth perception, at least in part, through learning experiences. That means the brain of a child has already developed most of the neural model needed to perform reasonable 3D interpretation of any 2D image or drawing or painting by way of monocular stereopsis. Conventional known 3D image generation exploit binocular stereopsis presenting two mutually different perspective images to a viewer's left-eye and right-eyes, the images being captured from different perspectives.

Fortunately, and likely for survival reasons, the human brain has a special configuration of neurons that perform incredibly rapid parallax and plasticity processing without cognitive intervention. Research suggests that the human visual cortex sorts portions of any perceived images into depths by means of Z-ordering ("depth") buffer into around 40 slots, the slots corresponding to layers of the visual cortex. Evolution has decided that around 40 is sufficient for coordination of eyes and hands, many of the slots being organized more closely to the viewer. The brain is capable of sorting the regions of the image into the around forty slots based upon visual cues within the image. It will be appreciated that auto 3D is achieved by employing a plurality of complex cues including:

- motion within a field of view;
- colors (red/blue, etc.) and variations in color present in the field of view;
- brightness of features and variations within the field of view;
- blurring occurring within the field of view;
- perspective present within the field of view;
- shadows present within the field of view;
- a viewer frustum associated with the field of view;
- a size of the field of view;
- atmospheric haze present within the field of view;
- positions and angles angle of visible features within the field of view;
- occlusion of features present in the field of view; and
- perceived differences in perspective based upon binocular vision.

Such data inputs are all fed into the brain (predominantly the visual cortex), which performs feature matching and computes "weighted" averages between the differences to perform auto 3D. The brain is not always 100% accurate as is known from various optical illusions. When all cues but those based upon binocular vision are present, the human brain can be "tricked" into interpreting the field of view as a 3D experience. In causing the brain to have a 3D experience based on a subset of the cues, as aforementioned, it is found to be important to those cues present in an image as perceived by the dominant eye. Humans, almost without exception, have a dominant eye and a non-dominant eye, determined by a manner in which the humans' brains are configured.

Natural vision already sends two conflicting image streams of the user's environment to the brain to process; there, the brain must decide which of the two image streams is a "primary" image. Further, in natural vision, rather than to select one or the other of two images as the superior, the brain selects the image perceived through its dominant eye (DE). The inventor asserts that in natural vision, the human brain does largely ignore input to the non-dominant eye (NDE). But, that ignoring is selective and not complete. By way of proof, if the NDE is covered to blank its view, the brain seems to disable or "suppress" its efforts to achieve 3D convergence entirely. The inventor observes that some specific measure exists to produce a user's enhanced observation of depth.

Conversely, the inventor has observed that if there is no difference between the first image and the second image presented to the dominant and nondominant eyes respectively, the user experiences no depth perception. Between these extremes, the inventor posits that there is a range or type of alteration of the source image such that a slight distortion or a difference by a regimen of image transformation enables the user's depth perception. Likewise, an extreme image transformation threshold exists above which the brain of the viewer can no longer match the objects between the non-dominant image and the dominant image. This disagreement between the perceptions by the dominant and nondominant eye destroys the ability to perceive depth as the matching is no longer feasible; such a situation is referred to as being "non-coherent." As stated above, there is a quality known as "plasticity" that relates to volumetric information; plasticity is usually associated with "convergence".

Figure 3B:
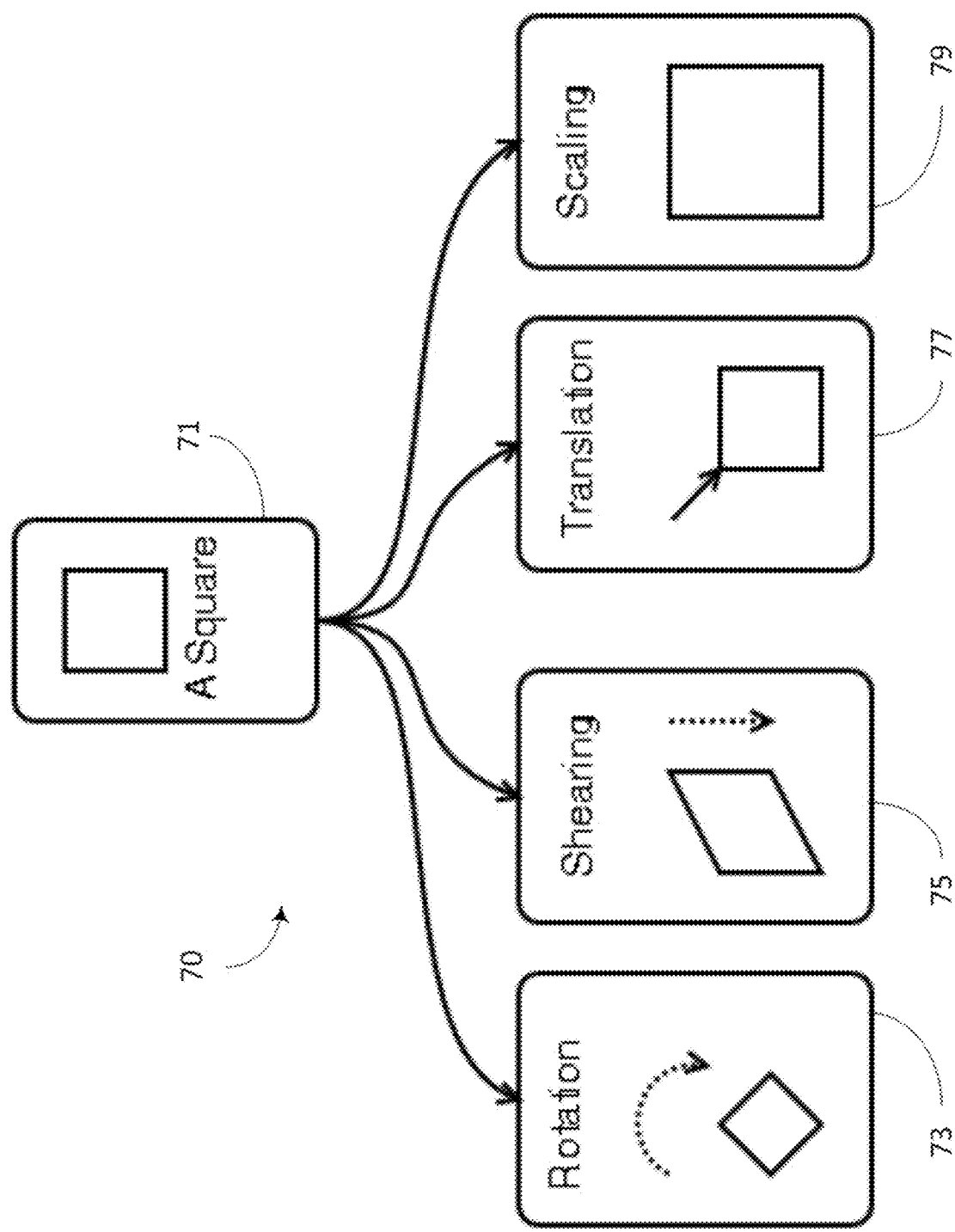
FIG. 3B depicts each of four affine transforms to define each of rotation, shearing (skewing), translation and scaling.

In Euclidean geometry, an affine transformation, or an affinity (from the Latin, affinis, "connected with"), is a geometric transformation that preserves lines and parallelism (but not necessarily distances and angles). An affine transformation is any transformation that preserves collinearity (i.e., all points lying on a line initially still lie on a line after transformation) and ratios of distances (e.g., the midpoint of a line segment remains the midpoint after transformation). While an affine transformation preserves proportions on lines, it does not necessarily preserve angles or lengths. Any triangle can be transformed into any other by affine transformations 70, so all triangles are affine and, in this sense, affine is a generalization of congruent and similar. FIG. 3B demonstrates four affine transformations that will be used herein to provide a vocabulary for this application.

To demonstrate the effects of each affine transform, the untransformed image 71 depicts a square. The first affine transform is a rotation 73 of the untransformed image 71. The square shape and size are preserved while the square is oriented at forty-five degrees relative to the untransformed image 71. While rotation is the first of the affine transforms set out here, there is nothing in the method that requires any particular order among the affine transforms that are used to generate the nondominant image. For ease of explanation, however, the discussion must start with one of the several affine transforms employed to generate the nondominant image.

A second transform is a shearing or skewing transform image 75. But, because the skewing transform is that which occurs within the skewing engine 43, which is portrayed as first in order, it is the first presented here. This skewing transform is also known as shearing distortion by virtue of the specific deformation of the image appears very much like a shearing deformation of any test coupon. The skewing engine performs what is known as a shear map. Applying a shear map to a set of points of the plane will change all angles between them (except straight angles), and the length of any line segment that is not parallel to the direction of displacement. Therefore, it will usually distort the shape of a geometric figure, for example turning squares such as the untransformed image 71 into non-square parallelograms such as the skewed image 75, and circles into ellipses (not shown). However, a shearing does preserve the area of geometric figures and the alignment and relative distances of collinear points. By way of further exemplary explanation, a shear mapping is the main difference between the upright and slanted (or italic) styles of letters.

The translation is the movement of the square of the untransformed image 71 by sliding it in any direction resulting in the movement intact without changing its rotational orientation, thus to result in the translated image 77. In a translation transformation all the points in the object are moved in a straight line in the same direction and each point is moved an equal distance. The size, the shape and the orientation of the image are the same as that of the original object. Same orientation means that the object and image are facing the same direction as demonstrated by comparing the untransformed image 71 to the translated image 77.

Finally, a scaling transform neither changes the shape of the object, nor does it rotate or slide the object. In Euclidean geometry, uniform scaling (or isotropic scaling as is employed in the presently preferred embodiment) is a linear transformation that enlarges (increases) or shrinks (diminishes) objects by a scale factor that is the same in all directions. Scaling is the process of expanding or compressing the dimensions (i.e., size) of an object. In Euclidean geometry, changing the size of an object is called a scale. Thus, the scaled image 79 resides in the center of the space as is the untransformed image 71, is oriented in the same direction, and is not sheared or skewed relative to the untransformed image 71 in any direction.

Based upon the experiences above, the inventor posits that the relationship between the images perceived by the dominant and nondominant eyes causes the user to experience the two images together in at least four modes:

Mode 1: Normal vision, wherein 3D processing is enabled and fake 2D images are detected as "flat";

Mode 2: DE and NDE inputs are too far apart for feature matching and auto 3D processing (e.g. NDE could also be closed); a user sees double images or the brain simply ignores NDE entirely or there is oscillation between DE and NDE inputs;

Mode 3: NDE input "disrupted"; the brain can perform "soft" feature matching between NDE and DE enough for auto 3D processing to be enabled; this corresponds to a desirable "sweet spot" in operation; and Mode 4: NDE and DE near-range binocular vision is activated and "converged" but the brain detects something is very wrong with resulting spatial data (since binocular vision is really only intended for close range), resulting in profound user discomfort.

Thus, the nondominant image processor 42nd is structured to present a second image that disrupts the NDE just enough so that auto 3D is still enabled but avoids activation of binocular vision (Mode 4) and avoids total decoherence (Mode 2). The selective distortion of the first or dominant image by the nondominant image processor 42nd is chosen to cause a selected threshold of NDE disruption, for example, is simply a matter of introducing a distortion that the brain already recognizes. The key to the method is to decouple the nondominant image from that which would be typical in a stereoptic pair such as the View-Master® second image. In response to this disruption to perception, the brain cannot take the easy answer and, in the inventive process, is force to supply the depth perception based upon the regions of the image and discerned cues as perceived by the dominant eye. Thus, exploiting the forty or so slots, to the cerebral cortex is forced to generate a three-dimensioned perception of the vista from which both eyes observe the scene.

The nondominant image processor 42nd serves to deprive the visual cortex of binocular vision while preserving all other cues in the dominant image. The preservation of the listed cues in the nondominant image while interrupting the binocular construction of the vista, presents the brain's vision circuitry with a puzzle which exploits the brains remarkable ability to rapidly recognize and process certain image morphisms such as affine transforms. In Euclidean geometry, an affine transformation, or an affinity (from the Latin, affinis, "connected with"), is a geometric transformation that preserves lines and parallelism (but not necessarily distances and angles). Affine transformation models include linear transformation models including rotation, scaling, and translation. These three affine transformation models are specifically apt for generating a nondominant image from the dominant image. The nondominant image does, even in performing the affine transformation, preserve corner features.

Affine transforms are also a computationally simple way to implement approximate pin-cushion image distortion. Thus, beneficially, the brain will still match features between the original image and the affine-transformed corresponding image to achieve coherence. While disrupting the pure binocular image configuration, these preserved corners, colors, textures and other cues, give enough cues to allow the visual cortex to reconstruct the three-dimensioned vista from the preserved visual cues.

Thus, the presently preferred embodiment of the nondominant image processor 42nd depicted in FIG. 3A comprises performance of a method having three elements. The order of these three transforming engines are presented, here, in an order corresponding to the depiction in FIG. 3A, however, there is no specific order in which these affine transformations must be performed to produce the required effect. While there is a default setting, as described above, the skewing engine 43 is responsive to user input to either increase or to decrease the skewing influence the skewing engine 43 exerts on the first image.

The second engine depicted here is a rotation engine 44 that enacts a rotation of the skewed image as it emerges from the skewing engine 43. Rotation is another affine transformation. Here too, the rotation engine 44 is responsive to user input as to degree though default settings are available to the skewing engine 43. Finally, a scaling or translating engine 45 completes the affine trio of engines. As with the other two, the scaling translating engine is responsive to user input relative to the degree of translation.

Figure 4:
FIG. 4 depicts a dominant image as would be presented to the dominant eye.

To demonstrate the actions of the nondominant image processor 42nd depicted in FIG. 3A, an image depicted in FIG. 4 is used as an exemplary case received as an image 90 with a resolution of 1920×1980. By way of exemplary explanation, the image is to be considered as that sort of image that might be generated by and received from the dominant image processor 42d. FIG. 4 is the "Before" image.

Figure 5:
FIG. 5 depicts each of a dominant image and a first intermediate or skewed image.

Just as expressed in the discussion of FIG. 3A, the affine transformations will be taken in the order shown, however, the order of applying these transforms is not critical in generating a suitable nondominant image generator. FIG. 5 depicts the actions of the skewing engine 43 upon the first image 90 to produce the skewed image 92. In this case, the default skew rate of 0.2 is applied to skew the intermediate skewed image 92 which is an intermediate step to produce, ultimately, the nondominant image to be presented to the nondominant eye while the first or dominant image 90 remains pristine.

Figure 6:
FIG. 6 depicts each of a dominant image and a second intermediate or skewed and rotated image.

FIG. 6 depicts the actions of the rotation engine 44 to further process the first image 90 to generate a further second image 94. The rotation engine 44 exerts the affine rotation transform to rotate the image 0.3 radians (clockwise).

Figure 7:
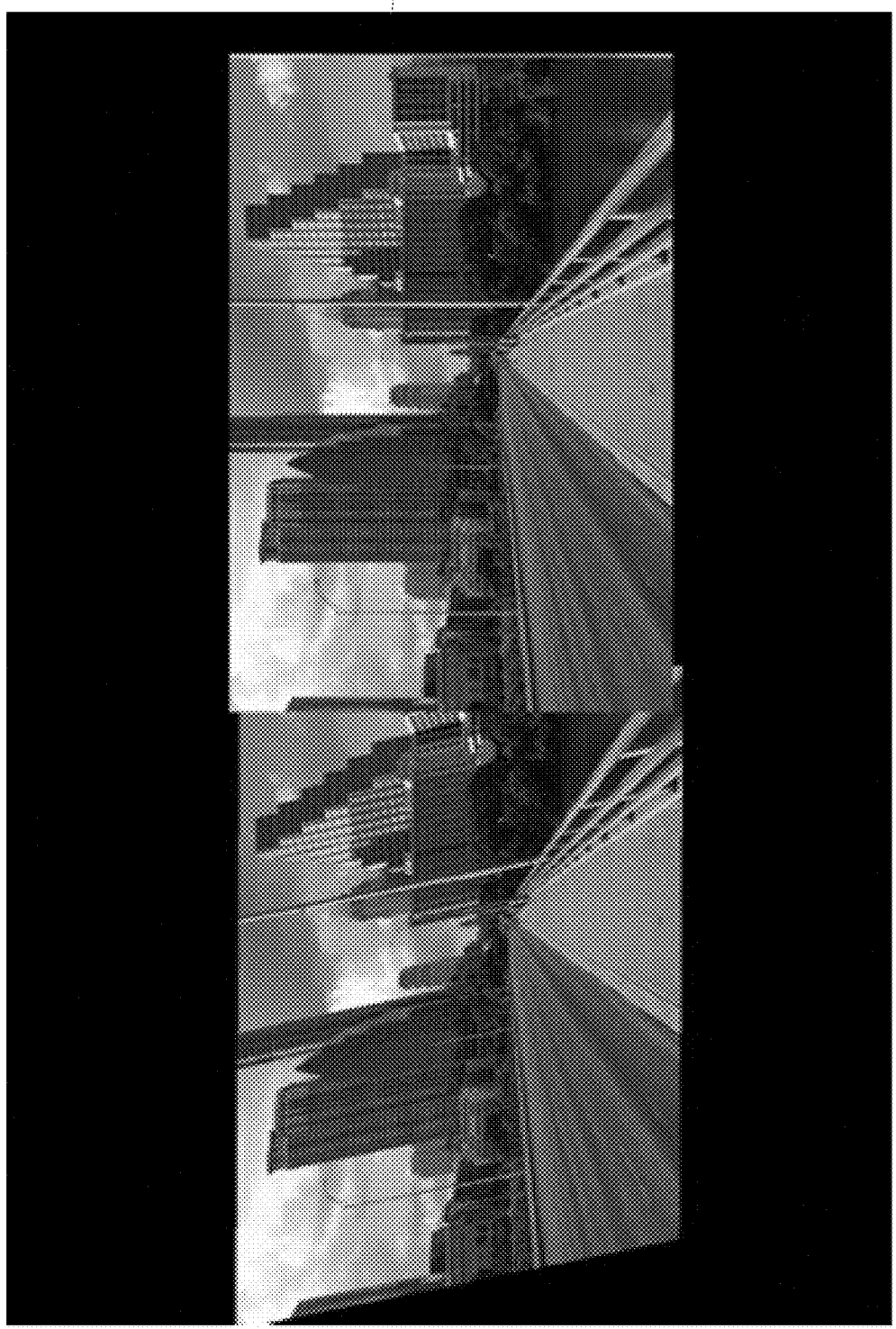
FIG. 7 depicts each of a dominant image and a skewed, rotated, and translated and scaled or nondominant image as would be presented to the nondominant eye.

Finally, in FIG. 7, the translation/scaling engine will exert the default movement whereby the image is shifted left by 100 pixels and down by 10 pixels. The final process results in the final second image 96. FIG. 7 shows the second image 96 shown to the nondominant eye as the dominant eye will review the first or dominant image 90. Together, when viewed through the physical optics 60. The optic chiasm 6 will meld the images into a depth-enhance image as perceived at the cerebral cortices 8r and 8l.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for generating a pair of two-dimensional images consisting of a two-dimensional dominant image to be displayed to a dominant eye and a two-dimensional nondominant image to be displayed to a nondominant eye such that in simultaneous viewing causes a user to perceive a three-dimensioned image, the method comprising:
   receiving the two-dimensional dominant image in a dominant image buffer;
   performing a skewing transformation on the two-dimensional dominant image to produce a first intermediate two-dimensional image, the first intermediate two-dimensional image differing from the two-dimensional dominant image by shearing displacement;
   performing a rotating transformation on the first intermediate two-dimensional image to produce a second two-dimensional intermediate image, the second intermediate two-dimensional image differing from the first two-dimensional image by rotational displacement; and
   performing a translating and scaling transformation on the second two-dimensional intermediate image to produce the nondominant two-dimensional image for storage in the nondominant image buffer, the nondominant two-dimensional image differing from the second two-dimensional image by translational displacement.

2. The method of claim 1, wherein receiving the two-dimensional dominant image in the dominant image buffer includes a process selected from an image processing group consisting of auto-focusing, noise reduction, and image stabilization.

3. Graphics display engine for generating a pair of images consisting of a two-dimensional dominant image to be displayed to a dominant eye and a two-dimensional nondominant image to be displayed to a nondominant eye such that in simultaneous viewing causes a user to perceive a three-dimensioned image, the graphics display engine comprising:
   a dominant image buffer for receiving data including the two-dimensional dominant image;
   a nondominant image processor to perform affine transforms on the two-dimensional dominant image to produce the two-dimensional nondominant image, the nondominant image processor including:
      a skewing engine to perform a skewing transformation on the two-dimensional dominant image to produce a first two-dimensional intermediate image, the first intermediate two-dimensional image differing from the two-dimensional dominant image by shearing displacement;
      a rotating engine to perform a rotating transformation on the first two-dimensional intermediate image to produce a second two-dimensional intermediate image, the second intermediate two-dimensional image differing from the first two-dimensional image by rotational displacement;
      a translating engine for performing a translating and scaling transformation on the second two-dimensional intermediate image to produce the two-dimensional nondominant image for storage in the nondominant image buffer, the nondominant two-dimensional image differing from the second two-dimensional image by translational displacement; and
   the nondominant image buffer to receive the two-dimensional nondominant image from the nondominant image processor.

4. The graphics display engine of claim 3, wherein the dominant image buffer includes a dominant image process to perform a process selected from an image processing group consisting of auto-focusing, noise reduction, and image stabilization.

\* \* \* \* \*

UNITED STATES PATENT AND TRADEMARK OFFICE
CERTIFICATE OF CORRECTION

PATENT NO. : 11,375,180 B2
APPLICATION NO. : 17/118393
DATED : June 28, 2022
INVENTOR(S) : Youssef El Moumni It is certified that error appears in the above-identified patent and that said Letters Patent is hereby corrected as shown below:

In the Specification

Column 1, Line 25, should read: Humans perceive their surroundings based upon two Column 6, Line 48, should read: without distinct images to make up an image pair known; Line 59, should read: As stated, the zograscope presents two different Column 7, Line 40, should read: might be alternate means of generating; Line 59, should read: nondominant eye, causing a user to perceive a three-dimen- Column 15, Line 7, should read: phism on the image of the dominant image processor 42d Column 18, Line 58, should read: tional orientation, thus resulting in the translated image 77

Column 19, Line 47, should read: forced to supply the depth perception based upon the regions Signed and Sealed this
Eighteenth Day of October, 2022

Katherine Kelly Vidal
*Director of the United States Patent and Trademark Office*